(12) United States Patent
Willey et al.

(10) Patent No.: US 7,352,075 B2
(45) Date of Patent: Apr. 1, 2008

(54) METHODS AND APPARATUS FOR CONTROLLING ROTATIONAL SPEED OF A ROTOR

(75) Inventors: Lawrence Donald Willey, Simpsonville, SC (US); John Noel Cunningham, Roanoke, VA (US); Eric Gebhardt, Simpsonville, SC (US); Ulrich Uphues, Hannover (DE); William Edwin Holley, Greer, SC (US); Kirk Gee Pierce, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 11/368,939

(22) Filed: Mar. 6, 2006

(65) Prior Publication Data

US 2007/0205602 A1  Sep. 6, 2007

(51) Int. Cl.
*F03D 7/00* (2006.01)
(52) U.S. Cl. .......................................... 290/44; 290/55
(58) Field of Classification Search ................... 290/44
See application file for complete search history.

(56) References Cited

U.S. PATENT DOCUMENTS

| | | | |
|---|---|---|---|
| 4,495,423 A * | 1/1985 | Rogers | 290/44 |
| 4,695,736 A | 9/1987 | Doman et al. | |
| 4,700,081 A * | 10/1987 | Kos et al. | 290/44 |
| 4,703,189 A * | 10/1987 | DiValentin et al. | 290/44 |
| 5,083,039 A | 1/1992 | Richardson et al. | |
| 5,155,375 A | 10/1992 | Holley | |
| 6,137,187 A | 10/2000 | Mikhail et al. | |
| 6,856,039 B2 | 2/2005 | Mikhail et al. | |
| 7,042,110 B2 | 5/2006 | Mikhail et al. | |
| 7,081,689 B2 * | 7/2006 | Tilscher et al. | 290/44 |
| 7,233,129 B2 | 6/2007 | Erdman et al. | |
| 2004/0119292 A1 * | 6/2004 | Datta et al. | 290/44 |
| 2004/0207208 A1 | 10/2004 | Mikhail et al. | |
| 2005/0253396 A1 | 11/2005 | Mikhail et al. | |
| 2006/0033338 A1 | 2/2006 | Wilson | |
| 2007/0170724 A1 * | 7/2007 | Calley | 290/44 |

FOREIGN PATENT DOCUMENTS

| | | |
|---|---|---|
| EP | 0 120 654 | 6/1988 |
| EP | 1 612 413 A2 | 1/2006 |
| EP | 1832743 A1 * | 9/2007 |

(Continued)

OTHER PUBLICATIONS

EPO Search Report, App. No. 07103533 (Jul. 9, 2007).
Hau, E., "Windkraftanlagen, 10.3. Leistungs" (XP002398040) 318-333 (1995).
Leithead, et al., "Role and objectives of control for wind turbines," IEE Proceedings-C, 138:2C, pp. 135-148 (Mar. 1, 1991).

*Primary Examiner*—Joseph Waks
(74) *Attorney, Agent, or Firm*—Armstrong Teasdale LLP

(57) ABSTRACT

A method for controlling a rotational speed of a rotor having at least one rotor blade, a rotor shaft, and an electrical generator coupled thereto. The method includes controlling a torque of the rotor shaft by controlling a torque of the electrical generator, alternating between changing an angle of pitch of the at least one rotor blade and maintaining the angle of pitch of the at least one rotor blade substantially constant, and maintaining a substantially constant rotational speed of the rotor during variable wind speeds above a predetermined rated wind speed.

19 Claims, 6 Drawing Sheets

FOREIGN PATENT DOCUMENTS

| | | | |
|---|---|---|---|
| JP | 59183085 A | * | 10/1984 |
| JP | 10159706 A | * | 6/1998 |
| JP | 2005042603 | | 2/2005 |
| WO | WO 2004/067958 A1 | | 8/2004 |
| WO | WO 2006/007838 A1 | | 1/2006 |
| WO | WO 2006136337 A1 | * | 12/2006 |

* cited by examiner

US 7,352,075 B2

METHODS AND APPARATUS FOR CONTROLLING ROTATIONAL SPEED OF A ROTOR

BACKGROUND OF THE INVENTION

This invention relates generally to rotors, and more specifically to methods and apparatus for controlling the rotational speed of a rotor.

During operation of at least some known wind turbines, rotor speed is controlled to prevent the wind turbine rotor from rotating at or above a predetermined speed that may damage components of the wind turbine. For example, at least some known wind turbines control rotor speed by pitching the rotor blades using a pitch drive system that changes an angle of the rotor blades, thereby changing the aerodynamic torque of the rotor. Since their introduction, wind turbines have continuously increased in physical size and electrical power output. However, as rotor diameter and therefore rotor blade lengths increase, friction within the pitch drive system may also increase, which may increase the torque required by the pitch drive motor to pitch the rotor blades. Moreover, as rotor blade lengths increase it may also be more difficult to accurately control the rotor blade pitch because of increased gear backlash within the pitch drive system. As such, the pitch drive system may be required to perform more pitching operations to accurately control the angle of the rotor blades, which may increase parasitic power loses within the wind turbine and/or may increase an amount of cooling required by the pitch drive system to prevent damage thereto and/or failure thereof. Moreover, pitching the rotor blades may increase loads induced to a tower of the wind turbine due to the effect of blade pitch on rotor thrust.

BRIEF DESCRIPTION OF THE INVENTION

In one aspect, a method is provided for controlling a rotational speed of a rotor having at least one rotor blade, a rotor shaft, and an electrical generator coupled thereto. The method includes controlling a torque of the rotor shaft by controlling a torque of the electrical generator, alternating between changing an angle of pitch of the at least one rotor blade and maintaining the angle of pitch of the at least one rotor blade substantially constant, and maintaining a substantially constant rotational speed of the rotor during variable wind speeds above a predetermined rated wind speed.

In another aspect, a wind turbine includes a rotor having a hub, at least one rotor blade coupled to the hub, and a rotor shaft coupled to the hub for rotation therewith. The wind turbine also includes a blade pitch actuator coupled to the at least one rotor blade for controlling an angle of pitch of the at least one rotor blade, and an electrical generator coupled to the rotor shaft. The electrical generator is configured to couple to an electrical load. The wind turbine also includes a frequency converter coupled to the electrical generator, and a processor coupled to the blade pitch actuator and coupled to the frequency converter. The processor is configured to control a speed of the rotor by controlling a torque of the electrical generator using the frequency converter to thereby control a torque of the rotor shaft, by alternating between changing an angle of pitch of the at least one rotor blade using the blade pitch actuator and maintaining the angle of pitch of the at least one rotor blade substantially constant, and by maintaining a substantially constant rotational speed of said rotor during variable wind speeds above a predetermined rated wind speed.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
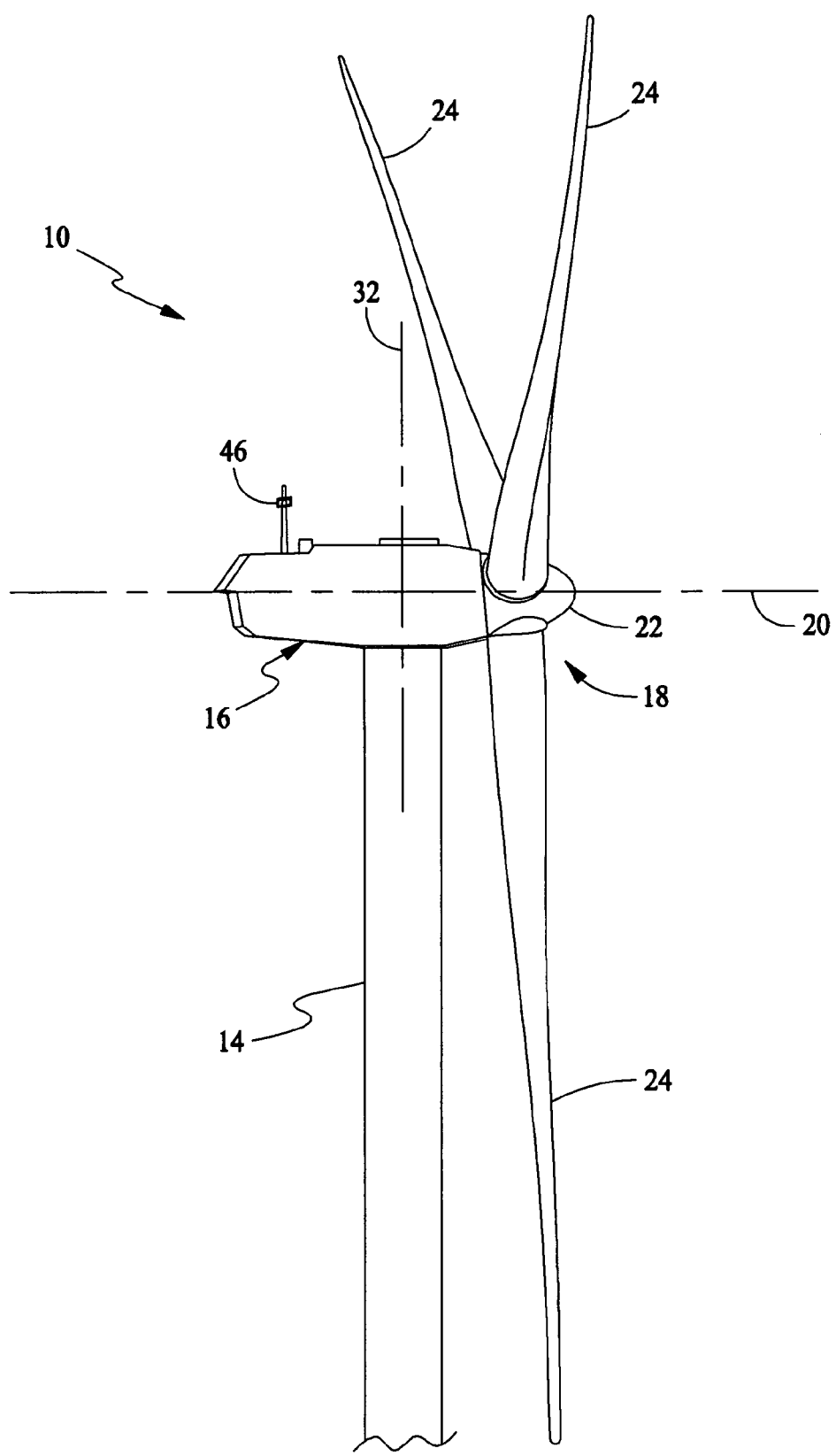
FIG. 1 is a perspective view of an exemplary wind turbine in accordance with an embodiment of the present invention.
Figure 2:
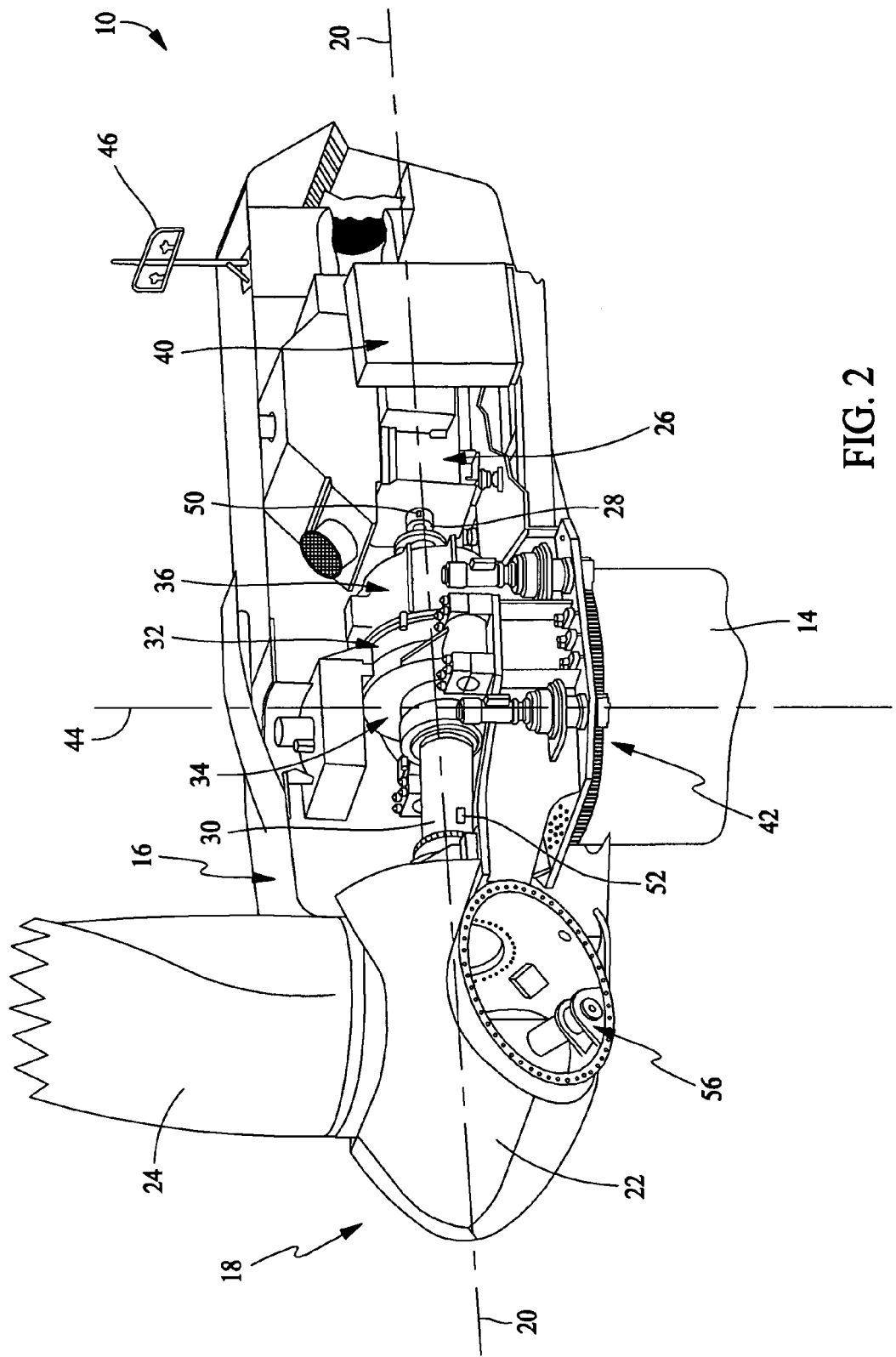
FIG. 2 is a partially cut-away perspective view of a portion of the wind turbine shown in FIG. 1 in accordance with an embodiment of the present invention.
Figure 3:
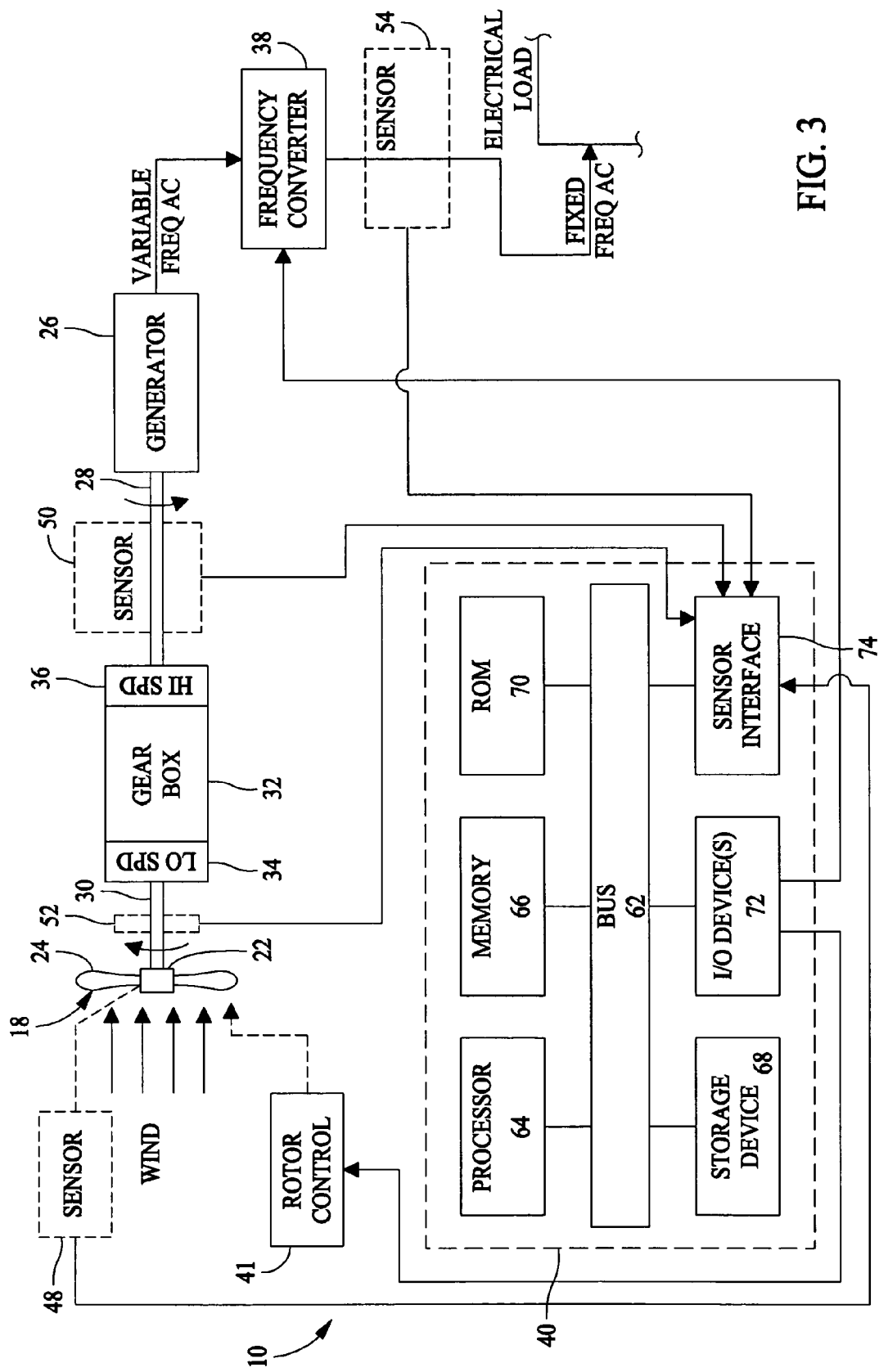
FIG. 3 is a schematic diagram of the wind turbine shown in FIGS. 1 and 2.

FIG. 1 is a perspective view of an exemplary wind turbine 10 in accordance with an embodiment of the present invention. FIG. 2 is a partially cut-away perspective view of a portion of wind turbine 10 in accordance with an embodiment of the present invention. FIG. 3 is a schematic diagram of wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown), for receiving electrical power therefrom to drive operation of wind turbine 10 and/or its associated components and/or for supplying electrical power generated by wind turbine 10 thereto. Although only one wind turbine 10 is shown in FIG. 1-3, in some embodiments a plurality of wind turbines 10 may be grouped together, sometimes referred to as a "wind farm".

Wind turbine 10 includes a body 16, sometimes referred to as a "nacelle", and a rotor (generally designated by 18)

coupled to body 16 for rotation with respect to body 16 about an axis of rotation 20. In the exemplary embodiment, nacelle 16 is mounted on a tower 14. However, in some embodiments, in addition or alternative to tower-mounted nacelle 16, wind turbine 10 includes a nacelle 16 adjacent the ground and/or a surface of water. The height of tower 14 may be any suitable height enabling wind turbine 10 to function as described herein. Rotor 18 includes a hub 22 and a plurality of blades 24 (sometimes referred to as "airfoils") extending radially outwardly from hub 22 for converting wind energy into rotational energy. Although rotor 18 is described and illustrated herein as having three blades 24, rotor 18 may have any number of blades 24. Blades 24 may each have any length (whether described herein). For example, in some embodiments one or more rotor blades 24 are about 0.5 meters long, while in some embodiments one or more rotor blades 24 are about 50 meters long. Other examples of blade 24 lengths include 10 meters or less, about 20 meters, about 37 meters, and about 40 meters. Still other examples include rotor blades between about 50 and about 100 meters long.

Despite how rotor blades 24 are illustrated in FIG. 1, rotor 18 may have blades 24 of any shape, and may have blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Another example of another type, shape, and/or configuration of rotor blades 24 is a darrieus wind turbine, sometimes referred to as an "eggbeater" turbine. Yet another example of another type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 2 and 3, wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine". In the exemplary embodiment, generator rotor shaft 28 is coupled to rotor shaft 28 through a gearbox 32, although in other embodiments generator rotor shaft 28 is coupled directly to rotor shaft 30. More specifically, in the exemplary embodiment gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to a power grid (not shown), coupled to generator 26. Frequency converter 38 may be located anywhere within or remote to wind turbine 10. For example, in the exemplary embodiment frequency converter 38 is located within a base (not shown) of tower 14.

In some embodiments, wind turbine 10 may include one or more control systems 40 coupled to some or all of the components of wind turbine 10 for generally controlling operation of wind turbine 10 and/or as some or all of the components thereof (whether such components are described and/or illustrated herein). For example, in the exemplary embodiment control system(s) 40 are coupled to a rotor control 41 for generally controlling rotor 18. In the exemplary embodiment, control system(s) 40 is mounted within nacelle 16. However, additionally or alternatively, one or more control systems 40 may be remote from nacelle 16 and/or other components of wind turbine 10. Control system(s) 40 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44 for changing a yaw of rotor 18, and more specifically for changing a direction faced by rotor 18 to, for example, adjust an angle between the direction faced by rotor 18 and a direction of wind. Yaw system 42 may be coupled to control system(s) 40 for control thereby. In some embodiments, wind turbine 10 may include anemometry 46 for measuring wind speed and/or wind direction. Anemometry 46, in some embodiments, may be coupled to control system(s) 40 for sending measurements to control system(s) 40 for processing thereof. For example, and although anemometry 46 may be coupled to control system(s) 40 for sending measurements thereto for controlling other operations of wind turbine 10, anemometry 46 may send measurements to control system(s) 40 for controlling and/or changing a yaw of rotor 18 using yaw system 42. Alternatively, anemometry 46 may be coupled directly to yaw system 42 for controlling and/or changing a yaw of rotor 18.

Wind turbine 10 may also include a plurality of sensors 48, each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 56 (described below). In some embodiments, sensors 48 are coupled to control system(s) 40 for sending pitch measurements to control system(s) 40 for processing thereof. In the exemplary embodiment, wind turbine 10 includes one or more sensors 50 coupled to generator rotor shaft 28 for measuring a speed of rotation of rotor shaft 28 and/or a torque of generator rotor shaft 28.

Sensor(s) 50 may be any suitable sensor having any suitable location within or remote to wind turbine 10, such as, but not limited to, optical encoders, digital proximity sensors, strain gages, and/or tachometers. In some embodiments, sensor(s) 50 are coupled to control system(s) 40 for sending speed measurements to control system(s) 40 for processing thereof. Moreover, in the exemplary embodiment, wind turbine 10 includes one or more sensors 52 coupled to rotor shaft 30 for measuring a speed of rotation of rotor shaft 28 and/or a torque of rotor shaft 30. Sensor(s) 52 may be any suitable sensor having any suitable location within or remote to wind turbine 10, such as, but not limited to, optical encoders, digital proximity sensors, piezo-electric transducers, strain gages, and/or tachometers. In some embodiments, sensor(s) 52 are coupled to control system(s) 40 for sending measurements to control system(s) 40 for processing thereof. Furthermore, in the exemplary embodiment, wind turbine 10 includes one or more sensors 54 coupled to generator 26 for measuring an electrical power output of generator 26. In some embodiments, sensor(s) 54 are coupled to control system(s) 40 for sending measurements to control system(s) 40 for processing thereof. Sensor(s) 54 may be any suitable sensor having any suitable location within or remote to wind turbine 10, such as, but not limited to, Hall effect current transducers (CTs) and/or capacitive voltage transducers (CVTs).

Wind turbine 10 may also include one or more other sensors (not shown) coupled to one or more components of wind turbine 10 and/or the electrical load, whether such component(s) are described or illustrated herein, for measuring parameters of such component(s). Such other sensor(s) may include, but are not limited to, sensors configured to measure displacements, yaw, pitch, moments, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether such component, location, and/or parameter is described and/or illustrated herein.

Figure 4:
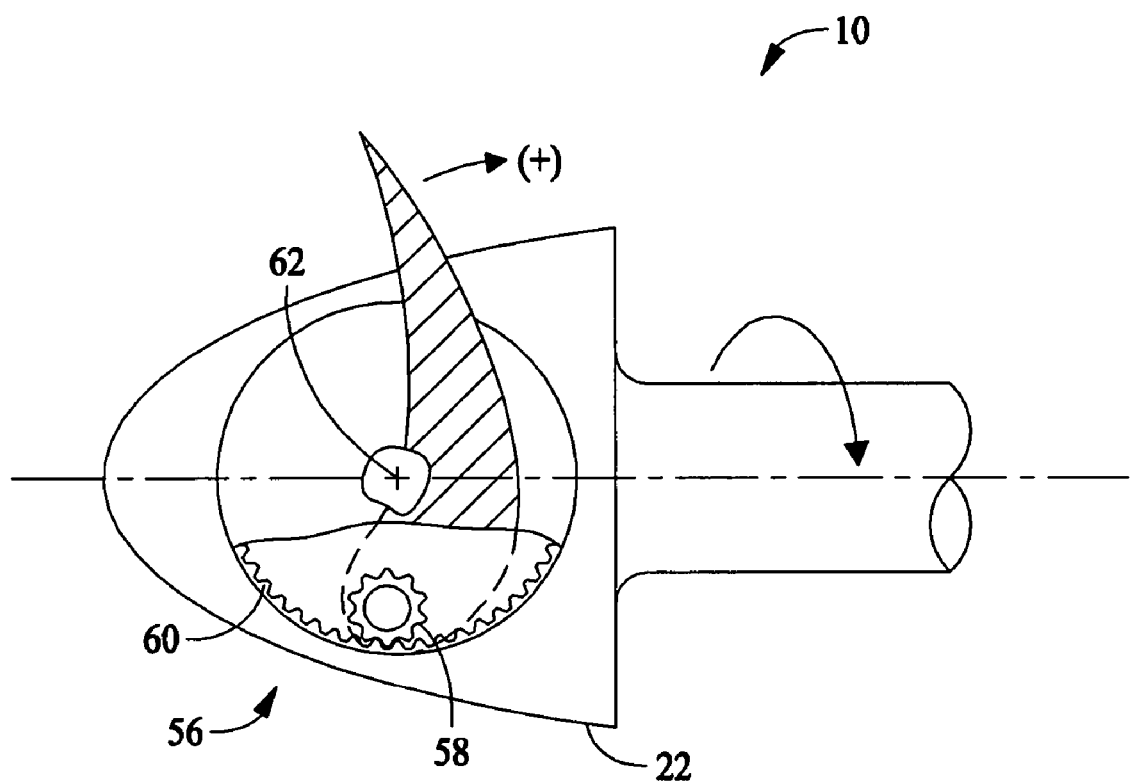
FIG. 4 is a cross-sectional view of a portion of a rotor hub of the wind turbine shown in FIGS. 1-3 illustrating an exemplary embodiment of a pitch system for changing a pitch of a rotor blade of the wind turbine shown in FIGS. 1-3.

Wind turbine 10 includes a variable blade pitch system 56 for controlling, including but not limited to changing, a pitch angle of rotor blades 24 (shown in FIGS. 1-3) with respect to a wind direction. FIG. 4 is a cross-sectional view of a portion hub 22 illustrating an exemplary embodiment of pitch system 56. Pitch system 56 may be coupled to control system(s) 40 (shown in FIGS. 1 and 2) for control thereby. Pitch system 56 includes one or more actuators (e.g., pitch drive gear 58 and pitch ring gear 60, described below) coupled to hub 22 and blades 24 for changing the pitch angle of blades 24 by rotating blades 24 with respect to hub 22. The pitch actuators may include any suitable structure, configuration, arrangement, means, and/or components, whether described and/or illustrated herein, such as, but not limited to, electrical motors, hydraulic cylinders, springs, and/or servomechansims. Moreover, the pitch actuators may be driven by any suitable means, whether described and/or illustrated herein, such as, but not limited to, hydraulic fluid, electrical power, electro-chemical power, and/or mechanical power, such as, but not limited to, spring force. In the exemplary embodiment, the pitch actuators include a pitch drive gear 58 that is coupled to a pitch ring gear 60, as shown in FIG. 4. Pitch ring gear 60 is coupled to blade 24 such that rotation of pitch drive gear 58 rotates blade 24 about an axis of rotation 62 to thereby change the pitch of blade 24.

In some embodiments, the pitch actuators may be driven by energy extracted from rotational inertia of rotor 18 and/or a stored energy source (not shown) that supplies components of wind turbine 10, such as, but not limited to, control system(s) 40 and/or pitch system 56, energy during an anomaly in the electrical load and/or power source coupled to wind turbine 10. For example, an anomaly in the electrical load and/or power source may include, but is not limited to, a power failure, an undervoltage condition, an overvoltage condition, and/or an out-of-frequency condition. As such, the stored energy source enables pitching of blades 24 during the anomaly. Although other stored energy sources may be used, in some embodiments the stored energy source includes hydraulic accumulators, electrical generators, stored spring energy, capacitors, and/or batteries. The stored energy sources may be located anywhere within, on, adjacent to, and/or remote from wind turbine 10. In some embodiments, the stored energy source stores energy extracted from rotational inertia of rotor 18, energy stored within converter 38, and/or other auxiliary energy sources such as, but not limited to, an auxiliary wind turbine (not shown) coupled to wind turbine 10, solar panels, and/or hydro-power installations.

Referring again to FIG. 3, in some embodiments, control system(s) 40 include a bus 62 or other communications device to communicate information. One or more processor(s) 64 are coupled to bus 62 to process information, including information from anemometry 46, sensors 48, 50, 52, and/or 54, and/or other sensor(s). Control system(s) 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. Control system(s) 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) 50 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system(s) 40 may also include a sensor interface 74 that allows control system(s) 40 to communicate with anemometry 46, sensors 48, 50, 52, and/or 54, and/or other sensor(s). Sensor interface 74 can be or can include, for example, one or more analog-to-digital converters that convert analog signals into digital signals that can be used by processor(s) 64.

Figure 5:
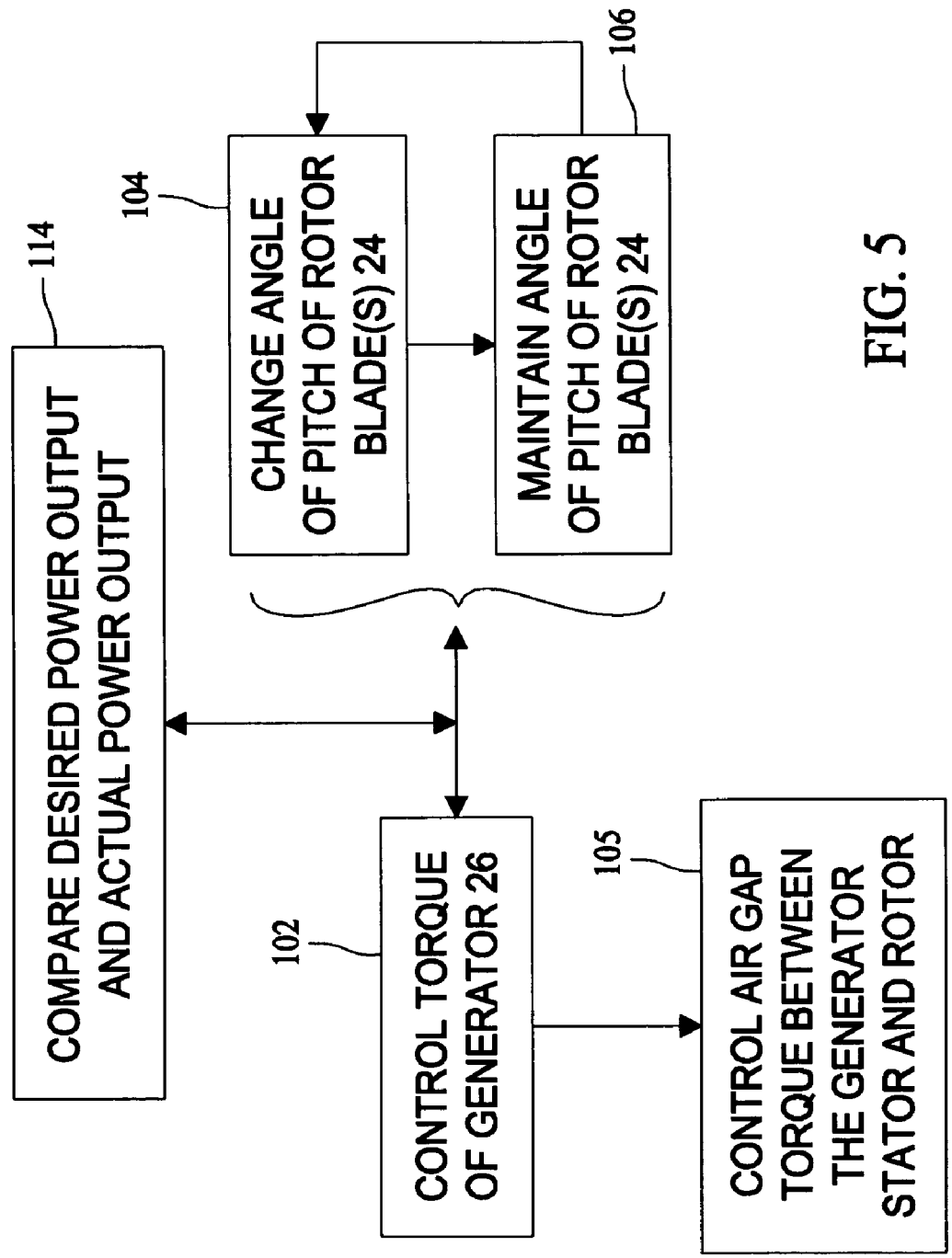
FIG. 5 is a flowchart illustrating an exemplary embodiment of a method for controlling a rotor speed of the wind turbine shown in FIGS. 1-3.

FIG. 5 is a flowchart illustrating an exemplary embodiment of a method 100 for controlling a speed of rotor 18 (shown in FIGS. 1-3). Method 100 includes controlling 102 a torque of generator 26 (shown in FIGS. 2 and 3) to thereby control a torque of rotor shaft 30 (shown in FIG. 2), and alternating between changing 104 an angle of pitch of one or more rotor blades 24 (shown in FIGS. 1 and 2) to facilitate controlling the speed of rotor 18 and maintaining 106 the angle of pitch of one or more rotor blades 24 substantially constant. Controlling 102 the generator torque may include, but is not limited to, selecting generator torque, changing the generator torque, and/or controlling a rate at which the generator torque is changed. The value(s) of generator torque selected, changed, and/or controlled may be any suitable value(s) or range thereof, such as, but not limited to +/−20% of a predetermined rated torque. Control 102 of generator torque may be performed during any portion of alternating between changing 104 and maintaining 106 pitch angle. For example, generator torque may be controlled 102 during a change 104 of blade pitch angle and/or while pitch angle is maintained 106. In some embodiments, and for example, if controlling 102 generator torque is sufficient to regulate a desired rotational speed of rotor 18, for example a speed that generates a desired power output of generator 26, blade pitch angle may not be changed 102. Moreover, and for example, in some embodiments generator torque is controlled 102 simultaneously with changing 104 pitch angle, for example, to facilitate preventing operation of wind turbine 10 at speeds and/or torques above or below predetermined limits.

Changing 104 the pitch angle of blades 24 may include controlling a rate at which the pitch angle of one or more blades 24 is changed. The value(s) of blade pitch angle changed 104 and/or maintained 106 may be any suitable value(s) or range thereof, such as, but not limited to, between about −5° and about +30°. In some embodiments, changing 104 of blade pitch may include a dead band to accommodate, for example, gear backlash. In some embodiments, the dead band is different depending upon a direction of change of pitch angle.

Controlling 102 a torque of generator rotor shaft 28 and alternating between changing 104 an angle of pitch of one or more rotor blades 24 and maintaining 106 the angle of pitch of one or more rotor blades 24 substantially constant may be performed using any suitable structure, process, and/or means. In the exemplary embodiment, method 100 controls 102 generator torque and alternates between changing 104 an angle of pitch of one or more rotor blades 24 and maintaining 106 the angle of pitch of one or more rotor blades 24 substantially constant using control system(s) 40 (shown in FIGS. 2 and 3) and input from anemometry 46 (shown in FIGS. 1 and 2), sensors 48 (shown in FIG. 1), 50 (shown in FIG. 2), 52 (shown in FIG. 2), and/or 54 (shown in FIG. 3), and/or other sensor(s). Generator torque may be controlled 102 using any suitable structure, process, and/or means. In the exemplary embodiment, frequency converter 38 (shown in FIGS. 2 and 3) controls 102 the torque of generator 26 by controlling 105 the air gap torque between the rotor and stator of generator 26 (shown in FIGS. 2 and 3). Moreover, in the exemplary embodiment, frequency converter 38 controls the torque of generator rotor shaft 28 (shown in FIGS. 2 and 3) to thereby control the torque of rotor shaft 30. However, in other embodiments, for example wherein wind turbine 10 is a direct-drive wind turbine, frequency converter 38 may control the torque of a coupling between the generator rotor and rotor shaft 30 to thereby control the torque of rotor shaft 30. Blade pitch may be controlled 102 using suitable structure, process, and/or means. In the exemplary embodiment, blade pitch is controlled 102 using variable blade pitch system 56.

Although method 100 may include controlling 102 generator torque and alternating between changing 104 and maintaining 106 blade pitch during variable speed operation of wind turbine 10 at or below a predetermined rated wind speed (which may be based on a desired power output of generator 26), in the exemplary embodiment method 100 controls 102 generator torque and alternates between changing 104 and maintaining 106 blade pitch to facilitate generally constant speed operation of wind turbine 10 (maintaining a substantially constant speed of rotor 18) at or above the predetermined rated wind speed. In some embodiments, the wind speed is variable above the predetermined rated wind speed such that method 100 controls 102 generator torque and alternates between changing 104 and maintaining 106 blade pitch to facilitate generally constant speed operation of wind turbine 10 during variable wind speeds over the predetermined rated wind speed.

Figure 6:
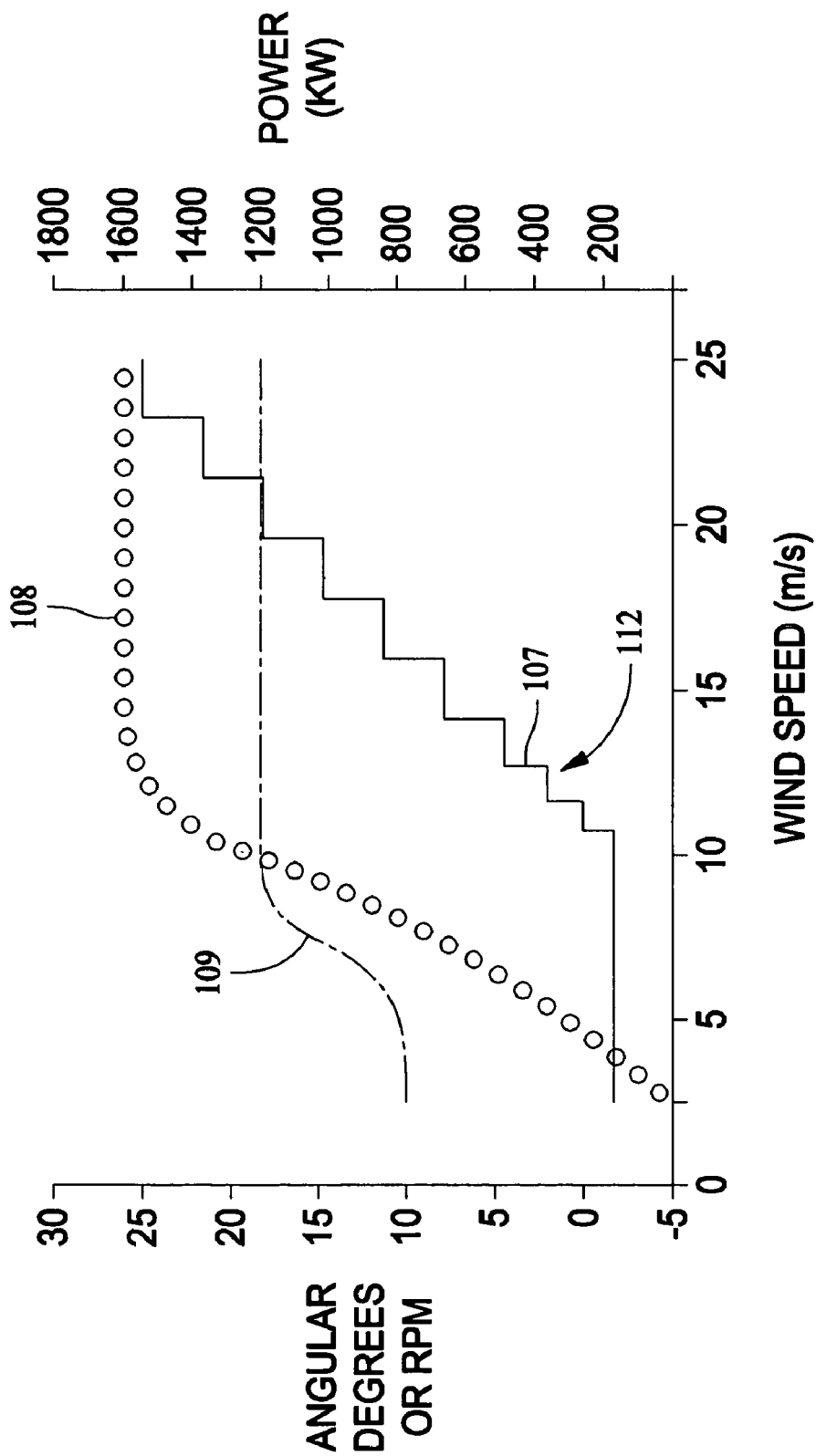
FIG. 6 is a graph illustrating an example of the method shown in FIG. 5.

FIG. 6 is a graph illustrating an example of method 100 (shown in FIG. 5) controlling 102 generator torque and alternating between changing 104 and maintaining 106 a blade pitch 107 at or above a predetermined rated wind speed. More specifically, as wind speed increases above a predetermined rated wind speed of about 11 m/s, method 100 controls 102 generator torque and alternates between changing 104 and maintaining 106 blade pitch 107 to facilitate maintaining a generally constant rotor speed 109 of about 1440 revolutions per minute (RPM). As such, above a wind speed of about 11 m/s, a generally constant average power output 108 of about 1550 kilowatts (KW) is generated from generator 26 (shown in FIGS. 2 and 3). Of course, FIG. 6 is only one example of method 100. Accordingly, wind speed, blade pitch 107, rotor speed 109, and power output 108 are exemplary values only. Wind speed, blade pitch 107, rotor speed 109, and power output 108 may have any other suitable value(s) depending upon, for example, a location of wind turbine 10, design parameters of wind turbine 10 overall and/or any component thereof, and/or other characteristics of wind turbine 10.

Referring now to FIGS. 5 and 6, in the exemplary embodiment alternating between changing 104 and maintaining 106 blade pitch includes changing 110 an angle of one or more rotor blades 24 in a plurality of successive steps. For example, FIG. 6 illustrates an example of method 100 wherein blade pitch is increased in a plurality of successive steps 112 as wind speed increases above the predetermined rated wind speed of about 11 m/s. Each successive step of blade pitch may be any suitable size, such as, but not limited to 0.3°. Moreover, each successive step may increase blade pitch or decrease blade pitch. In some embodiments, blade pitch is changed in a plurality of successive equal steps that each increase blade pitch. In some embodiments, blade pitch is changed in a plurality of successive equal steps that each decrease blade pitch. In some embodiments, blade pitch is changed in a plurality of successive equal steps, wherein some of the steps increase blade pitch and some of the steps decrease blade pitch. In other embodiments, one or more steps is different from one or more other steps. For example, as illustrated in FIG. 6, steps 112 include smaller steps between wind speeds of about 11 m/s and about 13 m/s that transition to larger steps above about 13 m/s of wind speed.

To facilitate achieving a desired average power output of generator 26 and to facilitate avoiding continuous operation of wind turbine 10 at speeds and/or torques above or below predetermined limits, changing 104 and/or maintaining 106 blade pitch angle may be based, at least in part, on a comparison 114 between a desired power output and an actual power output of generator 26 generated during control 102 of generator torque. The actual power output of generator 26 may be measured or calculated. For example, in some embodiments control system(s) 40 receives a power output of generator 26 from sensor 54 (shown in FIGS. 2 and 3) and changes 104 or maintains 106 blade pitch angle based on the measured power output. In other embodiments, and for example, control system(s) 40 calculates the power output of generator 26 based on a measured torque of generator 26 (in the exemplary embodiment a measured torque of generator rotor shaft 28 received from sensor(s) 50, shown in FIGS. 2 and 3) or a measured torque of rotor shaft 30 received from sensor(s) 52 (shown in FIGS. 2 and 3), and based on a measured rotational speed of rotor shaft 30 received from sensor(s) 52 or a measured rotational speed of generator 26 (in the exemplary embodiment a measured rotational speed of generator rotor shaft 28 received from sensor(s) 50).

In some embodiments, method 100 includes using a reduced pitch control gain region on all pitch gains to reduce pitch activity when generator speed is adequately controlled by generator torque. More specifically, a reduced pitch control gain region may be used to facilitate smoothing a transition between changing 104 and maintaining 106 blade pitch angle. For example, in some embodiments method 100 includes regulating at least one transition between changing 104 and maintaining 106 blade pitch angle using a gain on a signal based on a difference between a measured torque of rotor 18 during control 102 and a substantially constant desired mean reference torque. Furthermore, and for example, in some embodiments method 100 includes regulating at least one transition between changing 104 and maintaining 106 blade pitch angle using a gain on a signal based on a difference between a measured speed of rotor 18 during control 102 and a substantially constant desired mean reference speed. Moreover, and for example, in some embodiments method 100 includes regulating at least one transition between changing 104 and maintaining 106 blade pitch angle using a gain on a signal based on a difference between a substantially constant desired mean reference power and either a measured electrical power output of electrical generator 26 or the product of a measured torque of rotor 18 during control 102 and a measured rotational speed of rotor 18 during control 102. Regulating at least one transition between changing 104 and maintaining 106 may include determining whether to change blade pitch angle based on whether the difference between the constant desired mean reference and the measured value (or product of a plurality of measured values) is above a predetermined threshold. For example, in some embodiments if the difference between the constant desired mean reference and the measured value (or product of a plurality of measured values) is above the predetermined threshold, blade pitch angle may be changed 104 in proportion to such difference. Moreover, and for example, in some embodiments if the difference between the constant desired mean reference and the measured value (or product of a plurality of measured values) is below the predetermined threshold, blade pitch angle may be maintained 106.

The herein-described and/or illustrated embodiments are cost-effective and efficient for controlling rotor speed. More specifically, by controlling generator rotor shaft torque to control rotor speed and alternating between changing and maintaining blade pitch angle, the embodiments described and/or illustrated herein may facilitate reducing an amount of pitch movement required to control rotor speed. As such, the embodiments described and/or illustrated herein may facilitate reducing wear on pitch system components, may facilitate reducing parasitic power losses from the pitch system, and/or may facilitate reducing an interaction between blade pitch movements and rotor thrust induced tower oscillations.

Although the embodiments described and/or illustrated herein are described and/or illustrated with respect to a wind turbine, and more specifically controlling rotor speed of a wind turbine, practice of the embodiments described and/or illustrated herein is not limited to wind turbines. Rather, the embodiments described and/or illustrated herein are applicable to controlling as speed of any rotor having one or more blades.

Exemplary embodiments are described and/or illustrated herein in detail. The embodiments are not limited to the specific embodiments described herein, but rather, components and steps of each embodiment may be utilized independently and separately from other components and steps described herein. Each component, and each step, can also be used in combination with other components and/or method steps.

When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for controlling a rotational speed of a rotor having at least one rotor blade, a rotor shaft, and an electrical generator coupled thereto, said method comprising:
   controlling a torque of the rotor shaft by controlling a torque of the electrical generator;
   alternating between changing an angle of pitch of the at least one rotor blade in a plurality of successive steps and maintaining the angle of pitch of the at least one rotor blade substantially constant; and
   maintaining a substantially constant rotational speed of the rotor during variable wind speeds above a predetermined rated wind speed.

2. A method in accordance with claim 1 further comprising regulating at least one transition between changing an angle of pitch of the at least one rotor blade and maintaining the angle of pitch of the at least one rotor blade substantially constant using a gain on a signal based on a difference between a measured torque of the rotor and a substantially constant desired mean reference torque.

3. A method in accordance with claim 1 further comprising regulating at least one transition between changing an angle of pitch of the at least one rotor blade and maintaining the angle of pitch of the at least one rotor blade substantially constant using a gain on a signal based on a difference between a measured speed of the rotor and a substantially constant desired mean reference speed.

4. A method in accordance with claim 1 further comprising regulating at least one transition between changing an angle of pitch of the at least one rotor blade and maintaining the angle of pitch of the at least one rotor blade substantially constant using a gain on a signal based on a difference between a substantially constant desired mean reference power and one of a measured electrical power output of the electrical generator and the product of a measured torque of the rotor and a measured rotational speed of the rotor.

5. A method in accordance with claim 1 wherein changing an angle of pitch of the at least one rotor blade further comprises changing an angle of pitch of the at least one rotor blade based on a measured electrical power output of the electrical generator.

6. A method in accordance with claim 1 wherein changing an angle of pitch of the at least one rotor blade further comprises changing an angle of pitch of the at least one rotor blade based on a measured torque of one of the electrical generator and the rotor shaft and a measured rotational speed of one of the electrical generator and the rotor shaft.

7. A method in accordance with claim 1 wherein changing an angle of pitch of the at least one rotor blade in a plurality of successive steps comprises changing the angle of pitch of the at least one rotor blade in a plurality of substantially equal steps.

8. A method in accordance with claim 1 wherein changing an angle of pitch of the at least one rotor blade in a plurality of successive steps comprises changing the angle of pitch of the at least one rotor blade in a plurality of steps, wherein at least one step of the plurality of steps is different from at least one other step of the plurality of steps.

9. A method in accordance with claim 1 wherein the rotor is a first rotor and controlling a torque of the rotor shaft by controlling a torque of the electrical generator further comprises controlling an air gap torque between a second rotor of the electrical generator and a stator of the electrical generator.

10. A method in accordance with claim 1 wherein controlling a torque of the rotor shaft by controlling a torque of the electrical generator further comprises controlling a torque of the electrical generator during generally constant speed operation of the rotor one of at and above a predetermined rated wind speed.

11. A wind turbine comprising:
a rotor comprising a hub, at least one rotor blade coupled to said hub, and a rotor shaft coupled to said hub for rotation therewith;
a blade pitch actuator coupled to said at least one rotor blade for controlling an angle of pitch of said at least one rotor blade;
an electrical generator coupled to said rotor shaft, said electrical generator configured to couple to an electrical load;
a frequency converter coupled to said electrical generator; and
a processor coupled to said blade pitch actuator and coupled to said frequency converter, said processor configured to control a speed of said rotor by:
controlling a torque of said electrical generator using said frequency converter to thereby control a torque of said rotor shaft;
alternating between changing an angle of pitch of said at least one rotor blade in a plurality of successive steps using said blade pitch actuator and maintaining the angle of pitch of said at least one rotor blade substantially constant; and
maintaining a substantially constant rotational speed of said rotor during variable wind speeds above a predetermined rated wind speed.

12. A wind turbine in accordance with claim 11 wherein said processor is configured to regulate at least one transition between changing an angle of pitch of said at least one rotor blade and maintaining the angle of pitch of said at least one rotor blade substantially constant using a gain on a signal based on a difference between a measured torque of said rotor and a substantially constant desired mean reference torque.

13. A wind turbine in accordance with claim 11 wherein said processor is configured to regulate at least one transition between changing an angle of pitch of said at least one rotor blade and maintaining the angle of pitch of said at least one rotor blade substantially constant using a gain on a signal based on a difference between a measured speed of said rotor and a substantially constant desired mean reference speed.

14. A wind turbine in accordance with claim 11 wherein said processor is further configured to regulate at least one transition between changing an angle of pitch of said at least one rotor blade and maintaining the angle of pitch of said at least one rotor blade substantially constant using a gain on a signal based on a difference between a substantially constant desired mean reference power and one of a measured electrical power output of said electrical generator and the product of a measured torque of said rotor and a measured rotational speed of said rotor.

15. A wind turbine in accordance with claim 11 wherein said processor is configured to change an angle of pitch of said at least one rotor blade based on a measured electrical power output of said electrical generator.

16. A wind turbine in accordance with claim 11 wherein said processor is configured to change an angle of pitch of said at least one rotor blade based on a measured torque of one of said electrical generator and said rotor shaft and a measured rotational speed of one of said electrical generator and said rotor shaft.

17. A wind turbine in accordance with claim 11 wherein said processor is configured to change the angle of pitch of said at least one rotor blade in a plurality of substantially equal steps.

18. A wind turbine in accordance with claim 11 wherein at least one step of said plurality of steps is different from at least one other step of said plurality of steps.

19. A wind turbine in accordance with claim 11 wherein said processor is configured to control a torque of said electrical generator during generally constant speed operation of said wind turbine one of at and above a predetermined rated wind speed.

* * * * *